(12) United States Patent
Zhang et al.

(10) Patent No.: US 11,993,224 B2
(45) Date of Patent: *May 28, 2024

(54) SAFETY BELT RETRACTOR AND SAFETY BELT ASSEMBLY (71) Applicant: YANFENG AUTOMOTIVE SAFETY SYSTEMS CO., LTD, Shanghai (CN)

(72) Inventors: Lijun Zhang, Shanghai (CN); Fei Wang, Shanghai (CN)

(73) Assignee: YANFENG AUTOMOTIVE SAFETY SYSTEMS CO., LTD, Shanghai (CN)

(*) Notice: Subject to any disclaimer, the term of this patent is extended or adjusted under 35 U.S.C. 154(b) by 492 days.

This patent is subject to a terminal disclaimer.

(21) Appl. No.: 17/275,520

(22) PCT Filed: Aug. 14, 2019

(86) PCT No.: PCT/CN2019/100484
§ 371 (c)(1),
(2) Date: Mar. 11, 2021

(87) PCT Pub. No.: WO2020/052400
PCT Pub. Date: Mar. 19, 2020

(65) Prior Publication Data
US 2022/0118940 A1 Apr. 21, 2022

(30) Foreign Application Priority Data

Sep. 14, 2018 (CN) .......................... 201811070903.1

(51) Int. Cl.
B60R 22/40 (2006.01)
B60R 22/34 (2006.01)

(52) U.S. Cl.
CPC ...... B60R 22/40 (2013.01); B60R 2022/3402 (2013.01); B60R 2022/401 (2013.01)

(58) Field of Classification Search
CPC ... B60R 22/34; B60R 22/40; B60R 2022/401; B60R 2022/3402
See application file for complete search history.

(56) References Cited

U.S. PATENT DOCUMENTS

| 4,632,331 A | 12/1986 | Bracnik et al. |
| 5,507,449 A | 4/1996 | Kohlndorfer |
| (Continued) | | |

FOREIGN PATENT DOCUMENTS

| CN | 1333150 A | 1/2002 |
| CN | 1754724 A | 4/2006 |
| (Continued) | | |

OTHER PUBLICATIONS

International Search Report and Written Opinion issued in corresponding International Patent Application No. PCT/CN2019/100484, dated Nov. 20, 2019, 12 pages (English translation).

*Primary Examiner* — Sang K Kim
(74) *Attorney, Agent, or Firm* — Merchant & Gould P.C.

(57) ABSTRACT

The present invention relates to a safety belt retractor, including a bracket, a spool, a locking device, a vehicle sensing device (20) and a vehicle sensing suppression device, wherein the vehicle sensing suppression device includes a driven part and a suppression part. The driven part can be driven by the spool. The suppression part can be held on the driven part by an adhesive force, wherein the driven part has a sliding track, and the suppression part has a sliding portion that can slide on the sliding track against the adhesive force. The suppression part can be limited in a first end position, in which it can suppress the vehicle sensing function of the vehicle sensing device, and it can release the vehicle sensing function of the vehicle sensing device when leaving away from the first end position. Here, the mechanism for achieving the function of suppressing the vehicle sensing noise is simple in structure and low in cost, and can (Continued)

effectively reduce the vehicle sensing noise. The present invention further relates to a safety belt assembly including such a safety belt retractor.

19 Claims, 3 Drawing Sheets

(56) References Cited

U.S. PATENT DOCUMENTS

| | | | |
|---|---|---|---|
| 9,884,607 B2 | 2/2018 | Hodatsu | |
| 2009/0230227 A1 | 9/2009 | Yoshioka | |
| 2017/0341623 A1* | 11/2017 | Huh | B60R 22/405 |
| 2018/0236969 A1* | 8/2018 | Michel | B60R 22/405 |

FOREIGN PATENT DOCUMENTS

| | | |
|---|---|---|
| CN | 203920672 U | 11/2014 |
| CN | 107433927 A | 12/2017 |
| CN | 207466601 U | 6/2018 |
| CN | 207523649 U | 6/2018 |
| CN | 109177915 A | 1/2019 |
| CN | 109177916 A | 1/2019 |
| CN | 209258067 U | 8/2019 |
| CN | 209258068 U | 8/2019 |

* cited by examiner

SAFETY BELT RETRACTOR AND SAFETY BELT ASSEMBLY

This application is a National Stage Application of PCT/CN2019/100484, filed 14 Aug. 2019, which claims benefit of Serial No. 201811070903.1, filed 14 Sep. 2018 in China and which applications are incorporated herein by reference. To the extent appropriate, a claim of priority is made to each of the above disclosed applications.

TECHNICAL FIELD

The present invention relates to a safety belt retractor and a safety belt assembly including the same.

BACKGROUND ART

As an effective and reliable passive safety device, a safety belt assembly for a vehicle is a mandatory configuration for the vehicle safety. With the increasing number of vehicles and the increasing demand on the driving experience, occupants have higher and higher requirements on NVH. During the driving, due to the bumpiness of the road and the vibration of the vehicle body, the safety belt retractor may generate disturbing noise, which affects the occupants' driving experience.

In practice, some safety belt retractors are known, which are respectively provided with a locking device for locking a spool of the safety belt retractor in an emergency situation of a vehicle, such as in a traffic accident, so that an occupant can be better restrained and thus better protected.

Besides, some safety belt retractors are provided with a vehicle sensing device for triggering a locking function of a locking device in an emergency of a vehicle. In practice, various vehicle sensing devices are known, which are especially used to sense the acceleration/deceleration and/or an inclination angle and/or the vibration of a vehicle and/or other parameters that can reflect the emergency of the vehicle. For example, when the acceleration or deceleration of the vehicle reaches or exceeds a predetermined threshold value, the vehicle sensing device can trigger the locking function of the locking device, and thus the spool is locked.

During the normal driving of the vehicle, movable parts of the vehicle sensing device may frequently collide with other parts, wherein disturbing and undesirable noise is generated to the occupant of the vehicle. At present, in the market, for sensing the acceleration/deceleration, a following vehicle sensing device is widely used, which triggers a locking function of a locking device through the movement of a vehicle sensing steel ball in a steel ball seat caused by the acceleration/deceleration of the vehicle and by an angle of the vehicle. In such a vehicle sensing device, in the normal driving of the vehicle, collision between the steel ball seat and the vehicle sensing steel ball may be caused frequently, and thus disturbing noise may be generated.

In order to reduce or even eliminate the vehicle sensing noise of the vehicle sensing device during the normal driving, a vehicle sensing noise suppression function is known, which may improve the NVH level in the vehicle without affecting the safety performance of the safety belt retractor, and thus the driving experience of the occupant may be improved.

The publication U.S. Pat. No. 5,507,449A has disclosed a safety belt retractor with a vehicle sensing noise suppression function, in which a clutch and a spring for pre-tightening the clutch relative to a rotation shaft are provided, wherein the spring has a swingable spring swing arm. When the spring swing arm swings to an operation position, a vehicle sensing function of a vehicle sensing device can be suppressed, thereby the vehicle sensing noise suppression function may be achieved. When the safety belt retractor is to be locked urgently, extraction of a webbing belt drives a spool of the safety belt retractor to rotate, so that the spring swing arm swings away from the position of suppressing the vehicle sensing device, and thus the vehicle sensing function is restored to achieve the function of locking the spool urgently. In the prior art, the vehicle sensing suppression device has many components, and is insufficient in reliability and fatigue resistance, and the components are complex in the manufacturing process, and their assembling is not easy, and their manufacturing costs and assembling costs are both high.

Publications CN207523649U, U.S. Pat. No. 9,884,607B2 and CN207466601U are also relevant prior art.

SUMMARY OF INVENTION

Therefore, it is an object of the present invention to provide a safety belt retractor with a vehicle sensing noise suppression function and a safety belt assembly including the same, wherein the mechanism for achieving the vehicle sensing noise suppression function is simple in structure and low in cost, and can effectively reduce the vehicle sensing noise.

For this purpose, the present invention provides a safety belt retractor, including a spool, a locking device for locking the spool and a vehicle sensing device for triggering a locking function of the locking device, as well as a vehicle sensing suppression device for suppressing a vehicle sensing function of the vehicle sensing device, wherein the vehicle sensing suppression device includes a driven part and a suppression part, wherein the driven part can be driven by the spool, and the suppression part can be held on the driven part by an adhesive force, wherein the driven part has a sliding track, and the suppression part has a sliding portion that can slide on the sliding track against the adhesive force, wherein the suppression part has a stop that can cooperate with a stationary counter stop, so that the suppression part can be limited in a first end position, wherein the suppression part can suppress the vehicle sensing function of the vehicle sensing device in the first end position and can release the vehicle sensing function of the vehicle sensing device when moving away from the first end position.

With the safety belt retractor according to the present invention, the vehicle sensing function of the vehicle sensing device is suppressed in the normal driving of the vehicle, so that the vehicle sensing noise can be reduced or even eliminated. In an emergency situation, the vehicle sensing function of the vehicle sensing device is released, so that the vehicle sensing device can trigger the locking function of the locking device, and hence the occupant can be well restrained by a safety belt assembly equipped with the safety belt retractor in the emergency situation.

According to an advantageous embodiment of the invention, the driven part is kinematically coupled with the spool, so that the driven part moves in a first direction when the spool rotates in a winding direction, and moves in a second direction opposite to the first direction when the spool rotates in an unwinding direction.

According to an advantageous embodiment of the present invention, the stop can cooperate with a stationary counter stop, so that the suppression part can be limited in the first end position in the first direction, and can be limited in the second end position in the second direction.

According to an advantageous embodiment of the invention, the kinematical coupling between the driven part and the spool is achieved in such a way that the driven part is coaxially rotation-fixedly connected with the spool, for example, the driven part may be sleeved on a shaft head of the spool. Thereby a particularly compact structure may be achieved. Here, the rotation-fixed connection may be permanent and detachable or non-detachable, or it may be a connection with a clutch, and thus can be released under a predetermined condition, such as in an emergency of the vehicle.

It is also possible that the driven part is connected with the spool through a transmission. The driven part and the spool may be arranged coaxially or non-coaxially, for example, their rotation axes may be arranged at an angle with each other by means of a bevel gear transmission. Except for transmission of the rotation of the spool into the rotation of the driven part through the transmission, it is also possible to transmit the rotation of the spool into the linear movement of the driven part through the transmission, and hence, the winding of the spool can cause the driven part to move linearly in the first direction, and the unwinding of the spool can cause the driven part to move linearly in the opposite second direction.

According to the present invention, the suppression part can be held on the driven part by the adhesive force. It's advantageous in particular that the adhesive force may be achieved by a static friction force between the suppression part and the driven part. Alternatively or additionally, the adhesive force may also be achieved by a magnetic force between the suppression part and the driven part. For this purpose, for example, the suppression part and the driven part may be made of a permanent magnetic material or contain a component made of a permanent magnetic material. Alternatively or additionally, the adhesive force may also be achieved by a velcro connection that is commonly used in the textile field.

Since the suppression part can be held on the driven part by the adhesive force, the driven part can move together with the suppression part if the suppression part has not reached the end positions defined by the mutual contact of the stops in cooperation. When the suppression part reaches the first end position in the first direction, the driven part can continue to move in the first direction while the suppression part remains in the first end position. When the suppression part reaches the second end position in the second direction, the driven part can continue to move in the second direction while the suppression part remains in the second end position.

According to an advantageous embodiment, the suppression part has two stops, which can respectively cooperate with a respective stationary stop. Alternatively, it is also possible that the suppression part has only one stop, which cooperates with two stationary counter stops.

According to an advantageous embodiment, the driven part is a member of the locking device, for example, a locking trigger ratchet wheel of the locking device. Therefore, a separate driven part may be spared. According to an advantageous further embodiment, the locking device includes a locking trigger ratchet wheel sleeved on a shaft head of the spool, and the driven part is the locking trigger ratchet wheel.

According to an advantageous embodiment, the locking device includes a locking trigger ratchet wheel sleeved on a shaft head of the spool, and further includes a locking claw and a spring element, wherein the locking claw is received in a recess in an end region of the spool, and has a pin received in a kidney-shaped groove of the locking trigger ratchet wheel, and has teeth for cooperating with corresponding teeth of a bracket in which the spool is rotatably supported, wherein the spring element biases the locking claw towards a radially inner end of the kidney-shaped groove, so that the teeth of the locking claw are disengaged from the corresponding teeth of the bracket. When the locking trigger ratchet wheel is locked and the spool rotates in an unwinding direction, is the locking claw is forcibly guided, so that the teeth of the locking claw are engaged with the corresponding teeth of the bracket, and thus the spool is locked. As far as a locking device is concerned, there are various locking devices in the prior art that may be applied to the safety belt retractor according to the present invention.

According to an advantageous embodiment, the driven part has a circumferential portion having an inner circumferential surface, an axial end surface and an outer circumferential surface, wherein the inner circumferential surface forms the sliding track. Alternatively or additionally, it is also possible that the outer circumferential surface or the axial end surface of the circumferential portion forms the sliding track. For example, according to a further embodiment, the inner circumferential surface, the axial end surface and the outer circumferential surface of the circumferential portion together form the sliding track, and the sliding portion is configured as a U-shaped part surrounding the sliding track, wherein two side limbs and one bottom limb of the U-shaped sliding portion respectively contact the inner circumferential surface, the axial end surface and the outer circumferential surface of the circumferential portion.

According to an advantageous embodiment, the circumferential portion has an annular groove, and the suppression part has a hook engaged in the annular groove. According to a further embodiment, the annular groove extends into the circumferential portion axially or radially. Through the engagement between the hook and the annular groove, the mounting and positioning of the suppression part on the driven part may be achieved particularly simply.

According to an advantageous embodiment, the sliding portion of the suppression part forms an elongated spring leaf extending along the sliding track, and is configured to contact the inner circumferential surface of the circumferential portion as the sliding track. Furthermore, the suppression part has a supporting portion to be supported on the outer circumferential surface of the circumferential portion, so that the sliding portion contacts the sliding track with pretension.

Alternatively, it is also possible that the sliding portion of the suppression part forms an elongated spring leaf extending along the sliding track, and is configured to contact the outer circumferential surface of the circumferential portion as the sliding track. Furthermore, the suppression part has a supporting portion to be supported on the inner circumferential surface of the circumferential portion, so that the sliding portion contacts the sliding track with pretension.

Alternatively or additionally, it is also possible that the elastic sliding portion of the suppression part is pressed against the sliding track by a separate pressing member.

According to an advantageous embodiment, the sliding portion of the suppression part is a continuous element or includes a plurality of separate elements.

According to an advantageous embodiment, the stop forms a spring. Therefore, when the stop of the suppression part meets the stationary counter stop, the noise caused thereby is reduced or even eliminated. Alternatively or additionally, the stationary stop may also form a spring, or may be provided with a spring, or may be provided with other buffering means, for example, an elastomer element may be fixedly arranged on the stationary stop.

According to an advantageous embodiment, the suppression part has an elastic portion for suppressing the vehicle sensing function of the vehicle sensing device. The vehicle sensing device has movable parts. In principle, the suppression part can reduce the movability of the movable parts of the vehicle sensing device in its effective position, and hence can reduce the vehicle sensing noise accordingly. However, it is particularly advantageous that the suppression part can in principle completely suppress the movability of the movable parts in its effective position, for example, directly or indirectly press the movable parts of the vehicle sensing device by means of the elastic portion.

According to an advantageous embodiment, the suppression part is is integrally made of a steel sheet, and/or the driven part is integrally made of plastic. It is also possible that the suppression part and/or the driven part are made of any other suitable material, for example, both may be made of steel or may be made of plastic by injection molding.

According to an advantageous embodiment, the vehicle sensing device includes a sensing claw, a sensing ball and a sensing seat, wherein the sensing claw is pivotably supported in the sensing seat through a pin, and the sensing ball is movably placed between the sensing claw and the sensing seat, wherein the sensing ball can lift the sensing claw when moving away from its rest position, wherein the sensing claw can trigger the locking function of the locking device when being lifted by the sensing ball to a predetermined extent. As far as a vehicle sensing device per se is concerned, various forms are known in the prior art that may be applied to the safety belt retractor according to the present invention.

According to an advantageous embodiment, the locking device includes a locking trigger ratchet wheel, wherein the sensing claw can engage with the locking trigger ratchet wheel when being lifted to the predetermined extent by the sensing ball, and thus trigger the locking function of the locking device.

According to an advantageous embodiment, the suppression part has an elastic portion for suppressing the vehicle sensing function of the vehicle sensing device, wherein the elastic portion presses the sensing claw when the suppression part is in the first end position, and releases the sensing claw when the suppression part leaves away from the first end position.

According to an advantageous embodiment, the suppression part is integrally made of a steel sheet, wherein the sliding portion of the suppression part forms an elongated spring leaf extending along the sliding track and is configured to contact the inner circumferential surface of the circumferential portion as the sliding track, wherein the suppression part includes an arm bent from the sliding portion along a longitudinal side of the sliding portion, wherein the arm has the stop, which is bent to form elasticity, at at least one of two ends is viewed in a length direction of the sliding portion in a first section adjacent to the sliding portion, wherein the arm has a hook cut and bent from the arm, and the hook is configured to engage into an annular groove axially extending into the circumferential portion of the driven part, wherein the arm has a supporting portion cut and bent from the arm, and the supporting portion is to be supported on the outer circumferential surface of the circumferential portion, wherein the arm has an elastic portion formed in such manner that the arm is bent in a second section away from the sliding portion, and the elastic portion is configured to suppress the vehicle sensing function of the vehicle sensing device, wherein the sliding portion is axially positioned on the circumferential portion through the engagement of the hook and the annular groove, and the sliding portion contacts the sliding track with pretension at least through the support of the supporting portion on the outer circumferential surface of the circumferential portion of the driven part.

Here, the suppression part is an integral component integrated with multiple functions, which minimizes the number of parts of the safety belt retractor according to the present invention, and the integrated suppression part can be simply and inexpensively manufactured by stamping a metal sheet.

According to an advantageous embodiment, the locking device, the vehicle sensing device and the vehicle sensing suppression device are arranged in an axial end region of the spool and covered by a mechanical side cover which is fastened to a bracket in which the spool is rotatably supported. The locking device is axially positioned by the mechanical side cover, and the vehicle sensing device is mounted to the mechanical side cover, and the stationary stop is arranged in the mechanical side cover or in a stationary part of the vehicle sensing device.

According to an advantageous embodiment, a coil spring side cover is provided in the other axial end region of the spool, in which a return spring for restoring the spool in a winding direction is mounted.

The present invention also provides a safety belt assembly including a webbing belt and the safety belt retractor according to the present invention, wherein the webbing belt can be wound on the spool of the safety belt retractor.

It should be pointed out here that technical features recited in the specification can be combined arbitrarily, only if combinations are technically feasible or to say not contradictory. All these combinations are technical contents recited in the specification.

BRIEF DESCRIPTION OF DRAWINGS

Hereinafter, the present invention will be explained in more detail by means of examples with reference to the accompanying drawings, which are used for better understanding of the present invention without limiting the present invention. Schematic drawings are as follows.

EMBODIMENTS

Figure 1:
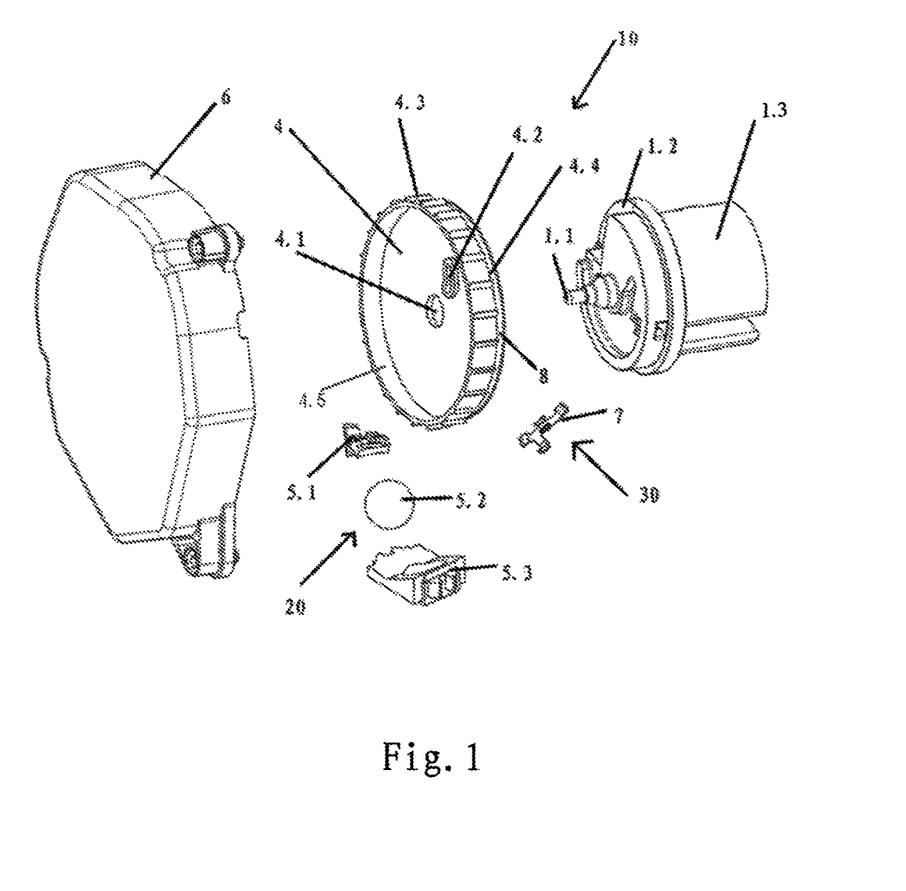
FIG. 1 is an exploded view of a safety belt retractor according to an embodiment of the present invention.

FIG. 1 is an exploded view of a safety belt retractor according to an embodiment of the present invention. The safety belt retractor includes a bracket (not shown), a spool 1 rotatably supported in the bracket, a locking device 10 for locking the spool, a vehicle sensing device 20 for triggering a locking function of the locking device, and a vehicle sensing suppression device 30 for suppressing a vehicle sensing function of the vehicle sensing device.

Here, the spool 1 is only shown partially, i.e. its section on the left side in FIG. 1. A coil spring side cover (not shown)

is provided in an axial end region on the right side (not shown) of the spool 1 and is fixed to the bracket, and receives a coil spring (not shown) for restoring the spool 1 in a winding direction. A webbing belt (not shown) can be wound on the spool 1 in the winding direction, and can be unwound from the spool 1 in an unwinding direction opposite to the winding direction.

In the axial end region of the spool 1 on the left side in FIG. 1, a mechanical side cover 6 is provided, which is also fixed to the bracket, for example, fastened to the bracket by screws. The locking device 10, the vehicle sensing device 20, and the vehicle sensing suppression device 30 are arranged in this axial end region on the left side of the spool 1, and are covered by the mechanical side cover 6. The locking device 10 is axially positioned by the mechanical side cover 6, and the vehicle sensing device 20 is mounted to the mechanical side cover 6.

The locking device 10 may include a locking pawl, a spring element, and a locking trigger ratchet wheel 4. The locking trigger ratchet wheel 4 is sleeved on a shaft head 1.1 of the spool 1 through its central shaft 4.1. In the left end region of the spool 1, a recess 1.2 is provided in the spool 1, and the locking claw is received in the recess 1.2. The locking claw has teeth which can cooperate with corresponding teeth in the bracket. The locking claw has a pin received in a kidney-shaped groove 4.2 of the locking trigger ratchet wheel 4. The spring element biases the locking claw towards a radially inner end of the kidney-shaped groove 4.2, so that the teeth of the locking claw are disengaged from the corresponding teeth of the bracket. For example, the spring element may be supported with one of its ends on the locking trigger ratchet wheel 4 and with the other end thereof on the pin.

In the case where the locking trigger ratchet wheel 4 isn't locked, the locking trigger ratchet wheel 4 can be driven by the spool 1 to rotate. In an emergency of the vehicle, such as in a traffic accident, the locking trigger ratchet wheel 4 is locked. At this time, the spool 1 continues to rotate in an unwinding direction due to the continuous extraction of the webbing belt, and hence the locking claw is forced to move radially outward in the kidney-shaped groove 4.2 against the spring force of the spring element, until the teeth of the locking claw engage with the corresponding teeth of the bracket, and thus the spool 1 is locked. The locking trigger ratchet wheel 4 is provided with ratchet teeth 4.3 distributed on a circumferential portion thereof. Adjacent to this circumferential portion, another circumferential portion 4.4 is provided, which will be described in detail below.

As shown in FIG. 1, the vehicle sensing device 20 includes a sensing claw 5.1, a sensing ball 5.2 and a sensing seat 5.3, wherein the sensing claw 5.1 is pivotably supported on the sensing seat 5.3 through a pin, and the sensing ball 5.2 is movably placed between the sensing claw 5.1 and the sensing seat 5.3, wherein the sensing ball 5.2 can lift the sensing claw 5.1 when moving away from its rest position. When the sensing claw 5.1 is lifted by the sensing ball to a predetermined extent, the sensing claw 5.1 engages with the ratchet teeth 4.3 of the locking trigger ratchet wheel 4, and thus the locking trigger ratchet wheel 4 is locked and thus the locking function of the locking device 10 can be triggered as mentioned above.

The vehicle sensing suppression device 30 includes a driven part 8 and a suppression part 7. In the embodiment shown in FIG. 1, the driven part 8 is achieved by a member of the locking device 10, more specifically by the locking trigger ratchet wheel 4. Therefore, it is possible to save a separate driven part, and it's only necessary to use the locking trigger ratchet wheel 4 that already exists.

Figure 2:
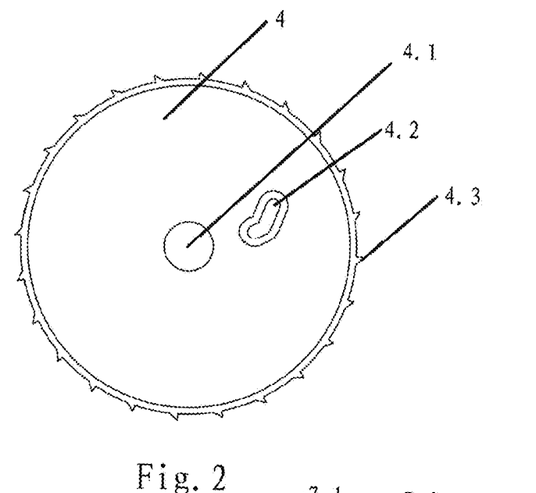
FIG. 2 is a schematic view of a locking trigger ratchet wheel of the safety belt retractor according to FIG. 1.

The driven part 8 or to say the locking trigger ratchet wheel 4 has a circumferential portion 4.4 with an inner circumferential surface and an outer circumferential surface, wherein the inner circumferential surface forms a sliding track 4.5. The circumferential portion has also an annular groove 8.1 that is axially extends into the circumferential portion and is configured for receiving a hook 7.5 of the suppression part 7.

Figure 3:
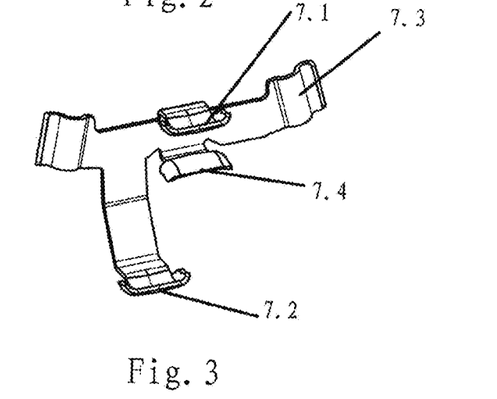
FIG. 3 is a perspective view of a suppression part of the safety belt retractor according to FIG. 1.

As shown in FIG. 3, the suppression part 7 includes a sliding portion 7.1, an elastic portion 7.2 for suppressing the vehicle sensing function, two stops 7.3 and the hook. By the engagement of the hook of the suppression part 7 with the annular groove of the driven part 8, the suppression part 7 is axially held on the circumferential portion of the driven part 8. The suppression part 7 further includes a supporting portion 7.4 supported on the outer circumferential surface of the circumferential portion 4.4. At least through the support of the supporting portion 7.4 on the outer circumferential surface 8.2 of the circumferential portion, and optionally additionally through the engagement of the hook with the annular groove, the sliding portion 7.1 contacts the sliding track of the driven part 8 with pretension. Through such contact with pretension, a predetermined static friction force exists between the sliding portion 7.1 and the sliding track. FIG. 3 shows an initial relaxed state of the sliding portion 7.1. When the sliding portion 7.1 contacts the cylindrical sliding track, the sliding portion can be elastically deformed, and thus the pretension is generated. One or two of the two stops 7.3 may also form a spring, for example, by bending respective areas of a steel sheet. The sliding portion 7.1 may be configured as a continuous element. Alternatively, it is also possible that the sliding portion 7.1 may include a plurality of separate elements. For example, it is also possible that the hook is cut and bent from the originally continuous sliding portion 7.1, so that the final sliding portion 7.1 includes a plurality of segments, which contact the sliding track.

In an alternative (not shown), the hook is firmly constructed, so that the radial pretension of the sliding portion 7.1 on the sliding track can be achieved, and hence the specific supporting portion 7.4 may also be spared.

According to a particularly advantageous embodiment, the suppression part 7 is integrally made of a steel sheet. The sliding portion 7.1 forms a spring leaf. An arm is bent from the sliding portion 7.1 along a longitudinal side of the sliding portion 7.1, and forms elastic stops 7.3 in such manner that it's bent at two ends viewed in a length direction of the sliding portion 7.1 in a first section adjacent to the sliding portion 7.1. In addition, the arm may have a hook cut and bent from the arm, and the hook engages into the annular groove axially extending into the circumferential portion of the driven part 8. Through the engagement of the hook with the annular groove, axially positioning of the suppression part 7 on the circumferential portion 4.4 is achieved.

In addition, one or more supporting portions 7.4 to be supported on the outer circumferential surface of the circumferential portion 4.4 may be formed, for example by cutting and bending. The sliding portion 7.1 contacts the sliding track of the driven part 8 with pretension at least mainly through the supporting portion 7.4, wherein the sliding track is formed on the inner circumferential surface of the circumferential portion of the driven part 8. The arm has an elastic portion 7.2 formed in such manner that the arm is bent in a second section facing away from the sliding portion 7.1, and the elastic portion is configured to suppress the vehicle sensing function. More specifically, in an effective position of the suppression part 7, the elastic portion 7.2 can press the sensing claw 5.1 of the vehicle sensing device 20, and thus in principle completely restrain the movement of the sensing ball 5.2, and thus the collision between the sensing ball 5.2 and the sensitive seat 5.3 during the normal driving of the vehicle and the resulting vehicle sensing noise are avoided.

Figure 4:
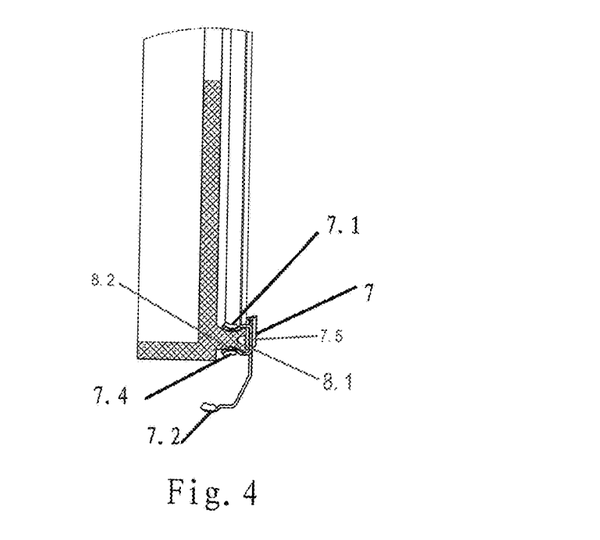
FIG. 4 is a partial longitudinal sectional view of a driven part together with the suppression part mounted thereon.

FIG. 4 is a partial longitudinal sectional view of the driven part 8 or to say the locking trigger ratchet wheel 4 with the suppression part 7 mounted thereon. The locking trigger ratchet wheel 4 has ratchet teeth 4.3 distributed on a circumferential portion on the left side in FIG. 4, and the suppression part 7 is mounted on a circumferential portion on the right side in FIG. 4. The sliding portion 7.1 can contact in a full-area manner the inner circumferential surface of the right circumferential portion. However, it is also possible that the sliding portion 7.1 can contact the inner circumferential surface of the right circumferential portion in two end sections in a length direction, while leaving a slight distance from the inner circumferential surface in a center section in the length direction.

Figure 5:
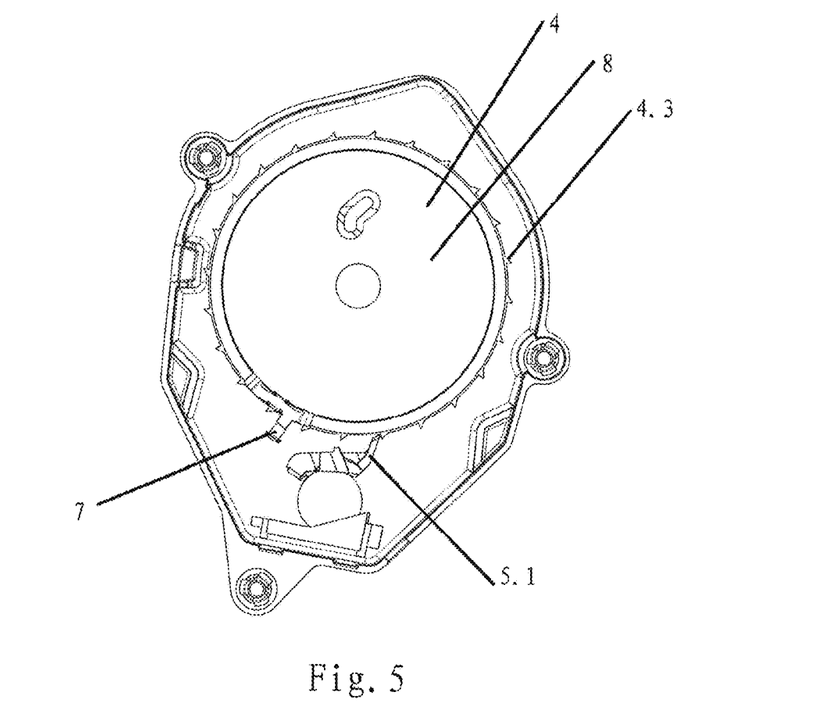
FIG. 5 is a side view of the safety belt retractor in a state where the vehicle sensing function is released.
Figure 6:
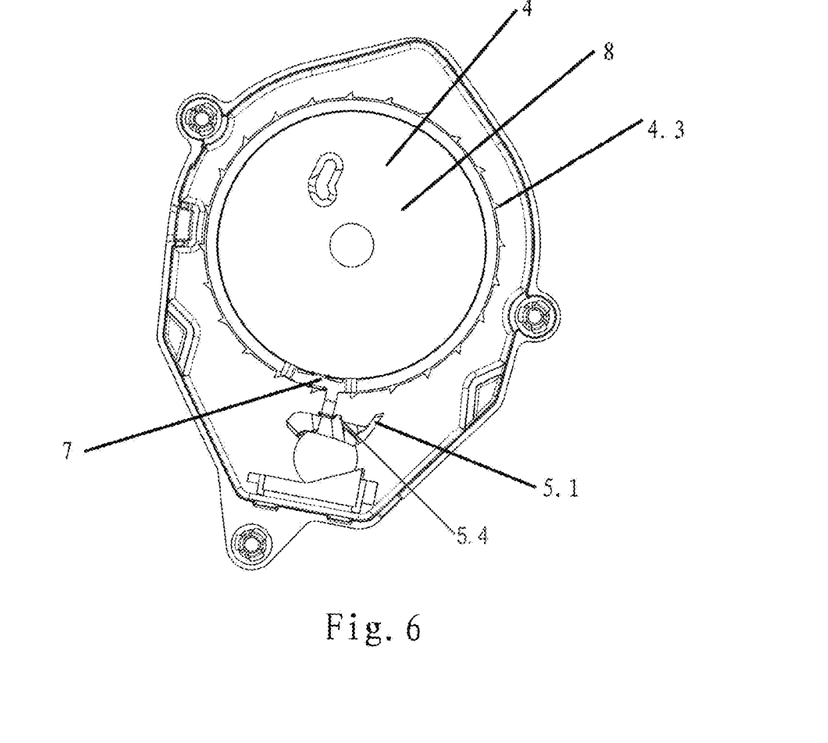
FIG. 6 is a side view of the safety belt retractor in a state where the vehicle sensing function is suppressed.

FIGS. 5 and 6 are respective side views of the safety belt retractor in an operation state. For illustrating the internal structure of the safety belt retractor, the mechanical side cover 6 is spared in FIGS. 5 and 6 respectively.

When an occupant wears the safety belt, the webbing belt is first extracted with a certain length, and then the webbing belt is wound under the restoring function of the coil spring, until the webbing belt contacts the occupant's body. In the winding process of the webbing belt by the restoring function of the coil spring, the driven part 8 is driven by the spool 1, and the suppression part 7 is driven by the driven part 8, and is limited and maintained in the first end position as shown in FIG. 6. The elastic portion 7.2 of the suppression part 7 presses the sensing claw 5.1 of the vehicle sensing device 20, so that the vehicle sensing function of the vehicle sensing device 20 is suppressed. In the normal driving of the vehicle, the suppression part 7 can in principle remain in the first end position, or can be reset to the first end position in time after leaving away from the first end position. Therefore, the vehicle sensing noise can be significantly reduced or even eliminated during the normal driving of the vehicle.

When the vehicle is in an emergency situation, such as in a vehicle collision, the webbing belt is quickly extracted, the driven part 8 is driven by the spool 1, and the suppression part 7 is driven by the driven part 8, so that the suppression part 7 leaves away the first end position as shown in FIG. 6, until it is limited to the second end position as shown in FIG. 5. When the suppression part leaves away from the first end position to a certain extent, the elastic portion 7.2 of the suppression part 7 doesn't act on the sensing claw 5.1 anymore, and thus the vehicle sensing function of the vehicle sensing device 20 is restored. The vehicle sensing device 20 senses the emergency situation of the vehicle in time, wherein the sensing ball 5.2 lifts the sensing claw 5.1, which triggers the ratchet wheel 4 to lock, and then the locking claw 2 is forced to engage with the corresponding teeth of the bracket to lock the spool 1.

The invention is explained in more detail by means of above specific embodiments. Finally, it should be pointed out that the above specific embodiments of the present invention are only used for understanding the present invention, and do not limit the scope of protection of the present invention. For those skilled in the art, modifications may be made on the basis of the above embodiments. All these modifications do not depart from the protection scope of the present invention.

The invention claimed is:

1. A safety belt retractor including a spool, a locking device for locking the spool and a vehicle sensing device for triggering a locking function of the locking device,
   wherein the safety belt retractor further includes a vehicle sensing suppression device for suppressing a vehicle sensing function of the vehicle sensing device, and the vehicle sensing suppression device includes a driven part and a suppression part,
   wherein the driven part can be driven by the spool,
   wherein the suppression part can be held on the driven part by an adhesive force, wherein the driven part has a sliding track, and the suppression part has a sliding portion that can slide on the sliding track against the adhesive force,
   wherein the suppression part has a stop that can cooperate with a stationary counter stop, so that the suppression part can be limited in a first end position,
   wherein the suppression part can suppress the vehicle sensing function of the vehicle sensing device in the first end position, and can release the vehicle sensing function of the vehicle sensing device when leaving away from the first end position.

2. The safety belt retractor as recited in claim 1, wherein the driven part is kinematically coupled with the spool, so that the driven part moves in a first direction when the spool rotates in a winding direction, and moves in a second direction opposite to the first direction when the spool rotates in an unwinding direction.

3. The safety belt retractor as recited in claim 2, wherein the stop can cooperate with the stationary counter stop, so that the suppression part can be limited in the first end position in the first direction and can be limited in the second end position in the second direction.

4. The safety belt retractor as recited in claim 1, wherein the driven part is a locking trigger ratchet wheel of the locking device.

5. The safety belt retractor as recited in claim 1, wherein the driven part has a circumferential portion having an inner circumferential surface, an axial end surface and an outer circumferential surface, wherein at least one of the inner circumferential surface, the axial end surface and the outer circumferential surface forms the sliding track.

6. The safety belt retractor as recited in claim 5, wherein the circumferential portion has an annular groove, and the suppression part has a hook engaged into the annular groove.

7. The safety belt retractor as recited in claim 6, wherein the annular groove extends into the circumferential portion axially or radially.

8. The safety belt retractor as recited in claim 5, wherein, the sliding portion of the suppression part forms an elongated spring leaf extending along the sliding track, and is configured to contact the inner circumferential surface of the circumferential portion as the sliding track, and
the suppression part has a supporting portion to be supported on the outer circumferential surface of the circumferential portion, so that the sliding portion contacts the sliding track with pretension.

9. The safety belt retractor as recited in claim 1, wherein the sliding portion of the suppression part forms an elongated spring leaf extending along the sliding track, and contacts the sliding track of the driven part with pretension.

10. The safety belt retractor as recited in claim 1, wherein the sliding portion of the suppression part is a continuous element.

11. The safety belt retractor as recited in claim 1, wherein the stop forms a spring.

12. The safety belt retractor as recited in claim 1, wherein the suppression part has an elastic portion for suppressing the vehicle sensing function of the vehicle sensing device.

13. The safety belt retractor as recited in claim 1, wherein the suppression part is integrally made of steel sheet, and the driven part is integrally made of plastic.

14. The safety belt retractor as recited in claim 1, wherein the vehicle sensing device includes a sensing claw, a sensing ball and a sensing seat, wherein the sensing claw is pivotably supported in the sensing seat through a pin, and the sensing ball is movably placed between the sensing claw and the sensing seat, wherein the sensing ball can lift the sensing claw when moving away from its rest position, and the locking function of the locking device can be triggered when the sensing claw is lifted by the sensing ball to a predetermined extent.

15. The safety belt retractor as recited in claim 14, wherein the locking device includes a locking trigger ratchet wheel, wherein the sensing claw can be engaged with ratchet teeth of the locking trigger ratchet wheel of the locking device when being lifted to the predetermined extent by the sensing ball, and thus the locking function of the locking device is triggered.

16. The safety belt retractor as recited in claim 14, wherein the suppression part has an elastic portion for suppressing the vehicle sensing function of the vehicle sensing device,
the elastic portion presses the sensing claw when the suppression part is in the first end position, and
the elastic portion releases the sensing claw when the suppression part moves away from the first end position.

17. The safety belt retractor as recited in claim 1, wherein,
the suppression part is integrally made of a steel sheet,
wherein the sliding portion of the suppression part forms an elongated spring leaf extending along the sliding track, and is configured to contact the inner circumferential surface of the circumferential portion of the driven part as the sliding track,
wherein the suppression part includes an arm bent from the sliding portion along a longitudinal side of the sliding portion,
wherein the arm forms an elastic stop in such manner that the arm is bent at least one of two ends viewed in a length direction of the sliding portion in a first section adjacent to the sliding portion,
wherein the arm has a hook cut and bent from the arm, and the hook is configured to engage into an annular groove axially extending into the circumferential portion of the driven part,
wherein the arm has a supporting portion cut and bent from the arm, and the supporting portion is to be supported on the outer circumferential surface of the circumferential portion of the driven part, and
wherein the arm has an elastic portion formed in such manner that the arm is bent in a second section away from the sliding portion, and the elastic portion is configured to suppress the vehicle sensing function of the vehicle sensing device,
wherein the sliding portion is axially positioned on the circumferential portion through the engagement of the hook with the annular groove, and the sliding portion contacts the sliding track with pretension at least through the support of the supporting portion on the outer circumferential surface of the circumferential portion of the driven part.

18. The safety belt retractor as recited in claim 1, wherein,
the locking device, the vehicle sensing device and the vehicle sensing suppression device are arranged in an axial end region of the spool and are covered by a mechanical side cover that is fastened to the bracket in which the spool is rotatably supported,
wherein the locking device is axially positioned by the mechanical side cover, and the vehicle sensing device is mounted to the mechanical side cover, and
wherein the stationary stop is arranged in the mechanical side cover or in a stationary part of the vehicle sensing device.

19. A safety belt assembly including a webbing belt and the safety belt retractor as recited in claim 1, wherein the webbing belt can be wound on the spool of the safety belt retractor.

* * * * *